US010335002B2

(12) United States Patent
Wang et al.

(10) Patent No.: US 10,335,002 B2
(45) Date of Patent: Jul. 2, 2019

(54) HAND-HELD VACUUM CLEANER

(71) Applicant: JIANGSU MIDEA CLEANING APPLIANCES CO., LTD., Suzhou (CN)

(72) Inventors: Xinzhou Wang, Suzhou (CN); Yonghua Wang, Suzhou (CN); Min Zhong, Suzhou (CN)

(73) Assignee: JIANGSU MIDEA CLEANING APPLIANCES CO., LTD., Suzhou, Jiangsu Province (CN)

( * ) Notice: Subject to any disclaimer, the term of this patent is extended or adjusted under 35 U.S.C. 154(b) by 77 days.

(21) Appl. No.: 15/636,082

(22) Filed: Jun. 28, 2017

(65) Prior Publication Data

US 2017/0296018 A1    Oct. 19, 2017

Related U.S. Application Data

(63) Continuation of application No. PCT/CN2016/077007, filed on Mar. 22, 2016.

(30) Foreign Application Priority Data

Jan. 20, 2016 (CN) .......................... 2016 1 0036809
Jan. 20, 2016 (CN) .......................... 2016 1 0037164
(Continued)

(51) Int. Cl.
*A47L 5/14*        (2006.01)
*A47L 9/16*        (2006.01)
(Continued)

(52) U.S. Cl.
CPC .......... *A47L 9/1641* (2013.01); *A01K 13/002* (2013.01); *A47L 5/14* (2013.01);
(Continued)

(58) Field of Classification Search
CPC . A47L 9/1641; A47L 5/14; A47L 5/24; A47L 9/0673; A47L 9/08; A47L 9/12;
(Continued)

(56) References Cited

U.S. PATENT DOCUMENTS 5,613,269 A * 3/1997 Miwa .................. A47L 5/14
                                                    15/319
6,317,921 B1 * 11/2001 Park .................. A47L 5/32
                                                    15/334
(Continued)

FOREIGN PATENT DOCUMENTS

CN    1263754        8/2000
CN    1368030 A      9/2002
(Continued)

OTHER PUBLICATIONS

Jiangsu Midea Clean electric Appliance Co. Ltd., First Office Action, CN201610036809.9, dated Jul. 28, 2017, 15 pgs.
(Continued)

*Primary Examiner* — Robert J Scruggs
(74) *Attorney, Agent, or Firm* — Morgan, Lewis & Bockius LLP

(57) ABSTRACT

A hand-held vacuum cleaner includes a dust cup including a first cyclone, a cyclone assembly, and a filtration member. The cyclone assembly includes a plurality of second cyclones, a guiding channel is defined between two of the plurality of the second cyclones, the guiding channel is in communication with the first air vent and an airflow is guided to an outer circumference of the cyclone assembly by the guiding channel along a tangent line to a circumferential wall of the second cyclone adjacent to the guiding channel, each second cyclone has an air inducing notch and is provided with an air guiding pipe, the filtration member is disposed along the outer circumference of the cyclone assembly, and the airflow in the outer circumference of the
(Continued)

cyclone assembly tangentially enters the second cyclone through the filtration member and the air inducing notch.

18 Claims, 11 Drawing Sheets

(30) Foreign Application Priority Data

| Jan. 20, 2016 | (CN) | 2016 1 0037608 |
|---|---|---|
| Jan. 20, 2016 | (CN) | 2016 2 0054307 U |
| Jan. 20, 2016 | (CN) | 2016 2 0054591 U |
| Jan. 20, 2016 | (CN) | 2016 2 0054836 U |

(51) Int. Cl.
```
        A01K 13/00    (2006.01)
        A47L 5/24     (2006.01)
        A47L 9/06     (2006.01)
        A47L 9/08     (2006.01)
        A47L 9/12     (2006.01)
        A47L 9/22     (2006.01)
```
(52) U.S. Cl.
CPC .............. *A47L 5/24* (2013.01); *A47L 9/0673* (2013.01); *A47L 9/08* (2013.01); *A47L 9/12* (2013.01); *A47L 9/122* (2013.01); *A47L 9/165* (2013.01); *A47L 9/1625* (2013.01); *A47L 9/1683* (2013.01); *A47L 9/22* (2013.01)

(58) Field of Classification Search
CPC ........ A47L 9/122; A47L 9/1625; A47L 9/165; A47L 9/1683; A47L 9/22; A01K 13/002
See application file for complete search history.

(56) References Cited

U.S. PATENT DOCUMENTS

| 9,027,198 | B2 | 5/2015 | Conrad | |
|---|---|---|---|---|
| 2005/0229355 | A1 | 10/2005 | Crouch et al. | |
| 2005/0251951 | A1* | 11/2005 | Oh | A47L 9/1625 15/353 |
| 2005/0252180 | A1* | 11/2005 | Oh | A47L 9/1625 55/345 |

FOREIGN PATENT DOCUMENTS

| CN | 1611169 A | 5/2005 |
|---|---|---|
| CN | 1695538 | 11/2005 |
| CN | 1839738 A | 10/2006 |
| CN | 1839742 A | 10/2006 |
| CN | 1951307 A | 4/2007 |
| CN | 1954752 A | 5/2007 |
| CN | 101437435 | 5/2009 |
| CN | 102188186 A | 9/2011 |
| CN | 102755135 | 10/2012 |
| CN | 103040416 A | 4/2013 |
| CN | 203970283 U | 12/2014 |
| CN | 203970286 U | 12/2014 |
| CN | 105011857 | 11/2015 |
| CN | 105030158 A | 11/2015 |
| CN | 105054864 | 11/2015 |
| CN | 205433556 | 8/2016 |
| CN | 205458420 | 8/2016 |
| CN | 103536248 A | 4/2018 |
| EP | 1736088 | 12/2006 |
| GB | 2336104 A | 10/1999 |
| GB | 2426919 A | 12/2006 |
| GB | 2448915 | 11/2008 |
| JP | 2005102892 A | 4/2005 |
| WO | WO2009131318 A2 | 10/2009 |

OTHER PUBLICATIONS

Jiangsu Midea Clean electric Appliance Co. Ltd., First Office Action, CN201610037164.0, dated Aug. 23, 2017, 14 pgs.

Jiangsu Midea Clean electric Appliance Co. Ltd., International Search Report and Written Opinion, PCT/CN2016/075614, dated Sep. 1, 2016, 17 pgs.

Jiangsu Midea Clean electric Appliance Co. Ltd., 2nd Office Action, CN201610036809.9, dated Apr. 17, 2018, 8 pgs.

Jiangsu Midea Cleaning Appliances Co. Ltd., International Search Report and Written Opinion, PCT/CN2016/077007, dated Oct. 10, 2016, 21 pgs.

* cited by examiner

HAND-HELD VACUUM CLEANER

PRIORITY CLAIM AND RELATED APPLICATIONS

This application is a continuation application of PCT Patent Application No. PCT/CN2016/077007, entitled "HAND-HELD VACUUM CLEANER" filed on Mar. 22, 2016, which claims priority to Chinese Patent Application No. 201610037608.0, entitled "Vacuum Cleaner" filed on Jan. 20, 2016, Chinese Patent Application No. 201620054307.4, entitled "Vacuum Cleaner", filed on Jan. 20, 2016, Chinese Patent Application No. 201610037164.0, entitled "Vacuum Cleaner", filed on Jan. 20, 2016, Chinese Patent Application No. 201620054836.4, entitled "Vacuum Cleaner", filed on Jan. 20, 2016, Chinese Patent Application No. 201610036809.9, entitled "Vacuum Cleaner", filed on Jan. 20, 2016, and Chinese Patent Application No. 201620054591.5, entitled "Vacuum Cleaner", filed on Jan. 20, 2016, all of which are incorporated by reference in their entirety.

TECHNICAL FIELD

The present disclosure relates to a technical field of vacuum cleaners, more particularly to a hand-held vacuum cleaner.

BACKGROUND

In the related art, a structure of a hand-held vacuum cleaner for separating dust and air is generally easy to clog an air channel. In addition, some hand-held vacuum cleaners separate dust and air by adopting a single stage cyclone structure. However, the single stage cyclone structure is simple, and the dust throwing effect is not significant, which easily causes clogging of a filtration member downstream of the single stage cyclone structure.

SUMMARY

The present disclosure seeks to solve at least one of the problems existing in the related art. Thus, one objective of the present disclosure is to propose a hand-held vacuum cleaner, a dust cup of the hand-held vacuum cleaner has a good separation effect.

The hand-held vacuum cleaner according to the present disclosure includes a dust cup, the dust cup includes a first cyclone, a cyclone assembly, and a filtration member. The first cyclone has an air intake channel having a first air intake and a first air vent, the cyclone assembly includes a plurality of second cyclones arranged in parallel along a circumferential direction of the first cyclone, a guiding channel is defined between two of the plurality of the second cyclones, the guiding channel is in communication with the first air vent and an airflow is guided to an outer circumference of the cyclone assembly along a tangent line to a circumferential wall of the second cyclone adjacent to the guiding channel, each second cyclone has an air inducing notch to allow the airflow to enter the second cyclone in a tangent direction, each second cyclone is provided with an air guiding pipe, the air guiding pipe is spaced apart from an inner circumferential wall of the second cyclone, the air guiding pipe has an air guiding inlet and an air guiding outlet, the air guiding inlet is in communication with the air inducing notch, the filtration member is disposed along the outer circumference of the cyclone assembly, the airflow in the outer circumference of the cyclone assembly tangentially enters the second cyclone through the filtration member and the air inducing notch.

With the hand-held vacuum cleaner according to the present disclosure, by providing the first cyclone, the filtration member and the plurality of second cyclones, it has a good dust-air separation effect. Moreover, by providing the air guiding pipe in the second cyclone, the residence time of the airflow in the second cyclone is prolonged, so that the airflow to be cleaned entering the second cyclone may be better cleaned.

According to an example of the present disclosure, an air guiding pipe is eccentrically disposed relative to the second cyclone.

According to an example of the present disclosure, the air guiding pipe extends in a vertical direction.

According to an example of the present disclosure, the air guiding pipe is provided with a separating plate therein.

According to an example of the present disclosure, the air guiding pipe is located in an upper portion of the second cyclone.

According to an example of the present disclosure, the air guiding inlet is formed in a lower end of the air guiding pipe, and the air guiding outlet is formed in an upper end of the air guiding pipe.

According to an example of the present disclosure, the filtration member is disposed surrounding the cyclone assembly, an avoiding notch is formed in the filtration member, and the avoiding notch and the guiding channel face each other.

According to an example of the present disclosure, a connecting wall tangent to a side wall of the second cyclone is connected to a side of the air inducing notch of each second cyclone, and an extension part extends from the other side of the air inducing notch, and an air inducing channel in a tangent direction is defined between the extension part and the connecting wall.

According to an example of the present disclosure, in a flow direction of the airflow, the extension part extends in a direction of the corresponding connecting wall.

According to an example of the present disclosure, an inner wall of an end of the air intake channel having the first air vent has a guiding surface configured to guide the airflow in the air intake channel to the guiding channel.

According to an example of the present disclosure, the guiding surface is formed as a curved surface.

According to an example of the present disclosure, the guiding channel is configured to have a width gradually increasing in the flow direction of the airflow.

According to an example of the present disclosure, an opening is formed in a bottom of each second cyclone.

According to an example of the present disclosure, the filtration member is a filter mesh, or an inserting sheet having a filtration hole.

According to an example of the present disclosure, the dust cup is disposed to the housing, the housing is provided with an air inlet, and an air blowing vent, the dust cup is connected to the air inlet, the air blowing vent is disposed adjacent to the air inlet, an electrical motor is disposed in the housing, the electrical motor is provided with an electrical motor chamber in communication with the dust cup, the airflow from the air inlet flows through the dust cup and the electrical motor, and flows out from the air blowing vent.

According to an example of the present disclosure, the air blowing vent extends obliquely in a direction of the air inlet.

According to an example of the present disclosure, the housing is provided with an air inlet pipe, in which the air inlet is formed in a free end of the air inlet pipe, and in a flow direction of the airflow, an end surface of the free end of the air inlet pipe extends obliquely in a direction away from the air blowing vent.

According to an example of the present disclosure, the end surface of the free end of the air inlet pipe is formed as an inclined plane.

According to an example of the present disclosure, the housing is provided with an air blowing channel, an end of the air blowing channel is in communication with the electrical motor chamber, and the air blowing vent is formed in the other end of the air blowing channel.

According to an example of the present disclosure, a section area of the air blowing channel is gradually reduced along the flow direction of the airflow.

According to an example of the present disclosure, the air blowing channel extends in a front-and-rear direction.

According to an example of the present disclosure, various pipes of the hand-held vacuum cleaner are connected to each other by ultrasonic welding.

According to an example of the present disclosure, an air outlet is formed in the housing, the airflow from the air inlet flows through the dust cup and the electrical motor, and flows out from at least one of the air outlet and the air blowing vent.

According to an example of the present disclosure, the air blowing vent is switchably connected to the electrical motor chamber.

According to an example of the present disclosure, a dust outlet is formed in a bottom of the dust cup, and the hand-held vacuum cleaner further includes an ash pouring plate disposed to a bottom of the housing, and the ash pouring plate being configured to be movable between an open position where the dust outlet is opened and an closed position where the dust outlet is closed.

According to an example of the present disclosure, an end of the ash pouring plate is pivotally connected to the housing, so that the ash pouring plate is rotatable between the open position and the closed position, and the other end of the ash pouring plate is detachably fitted with the housing.

According to an example of the present disclosure, the other end of the ash pouring plate is detachably fitted with the housing through at least one fitting mechanism, and the fitting mechanism includes: a first fitting member disposed to the other end of the ash pouring plate; and a second fitting member disposed to the housing, the first fitting member is detached from the second fitting member when the ash pouring plate is in the open position, the first fitting member is fitted with the second fitting member when the ash pouring plate is in the closed position.

According to an example of the present disclosure, the first fitting member and the second fitting member are snaps snapped into each other.

According to an example of the present disclosure, the hand-held vacuum cleaner further includes a press button disposed to the housing, in which the second fitting member is disposed to the press button, and the second fitting member moves in a direction away from the first fitting member to be detached from the first fitting member when the press button is pressed.

According to an example of the present disclosure, an elastic element is disposed between the press button and the dust cup, and the elastic element is configured to normally push the press button in a direction away from a center of the housing.

According to an example of the present disclosure, the elastic element is a spring.

According to an example of the present disclosure, two fitting mechanisms are provided and the two fitting mechanisms are symmetric with each other in a left-and-right direction.

According to an example of the present disclosure, the ash pouring plate extends in a front-and-rear direction, and a rear end of the ash pouring plate is pivotally connected to the housing.

According to an example of the present disclosure, a seal element is disposed between the ash pouring plate and the dust outlet to seal a gap between the ash pouring plate and the dust outlet.

According to an example of the present disclosure, an outlet filtration member is disposed between the dust cup and the electrical motor.

According to an example of the present disclosure, the outlet filtration member is a high efficiency particulate air (HEPA) member or filter cotton.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS

Figure 1:
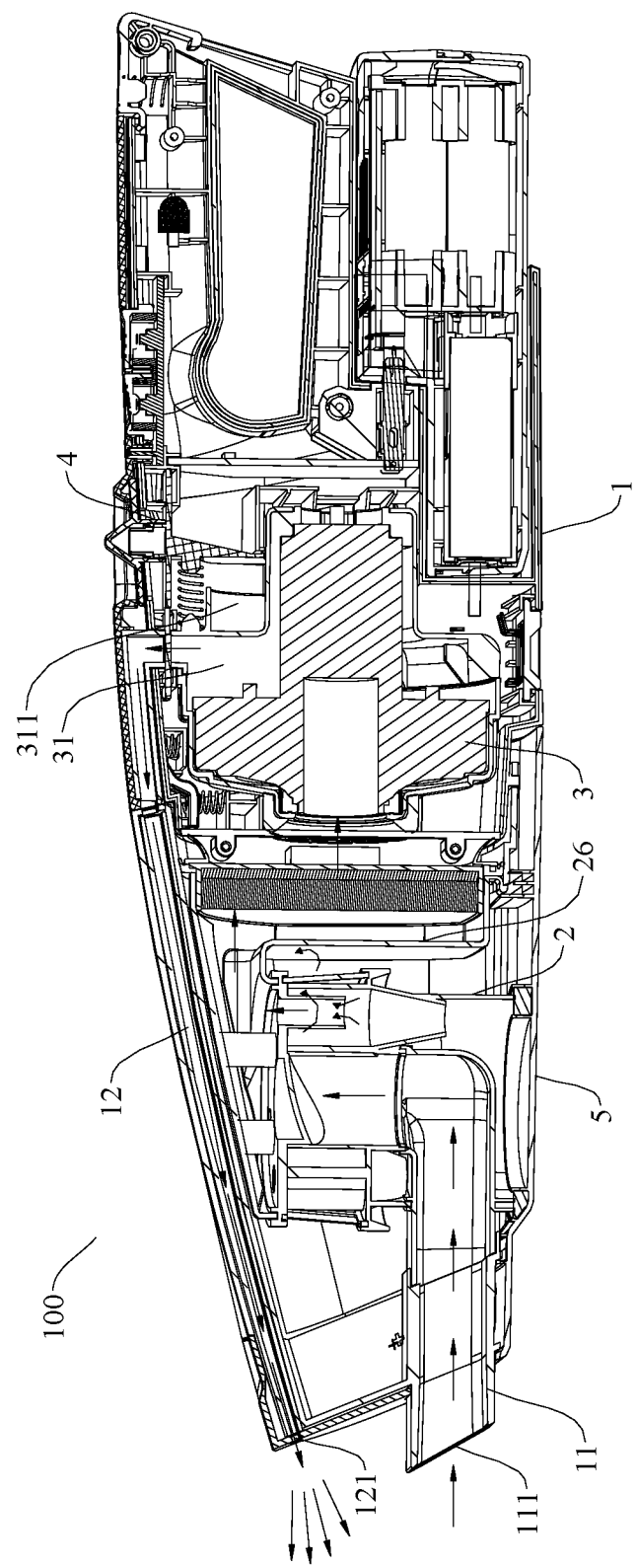
FIG. 1 is a schematic view of a hand-held vacuum cleaner according to embodiments of the present disclosure.

100: hand-held vacuum cleaner;
1: housing; 11: air inlet pipe; 111: air inlet;
12: air blowing channel; 121: air blowing vent;
2: dust cup; 21: air intake pipe; 211: air intake channel; 2111: air intake; 2112: air vent;

22: second cyclone; 221: air guiding pipe; 2211: air guiding inlet; 2212: air guiding outlet;
222: air inducing notch; 223: opening; 224: connecting wall; 225: extension part;
226: air inducing channel; 227: separating plate; 23: guiding channel;
3: electrical motor; 31: electrical motor chamber; 311: air outlet;
4: switching mechanism; 41: push plate; 411: communicating opening;
42: closing plate; 421: positioning post; 43: spring; 44: push button;
5: ash pouring plate; 51: pivoting shaft;
6: press button; 7: snap; 8: elastic element;
200: floor brush; 201: floor brush inlet; 202: floor brush opening; 203: floor brush outlet;
204: baffle; 205: bristle.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not require that the present disclosure be constructed or operated in a particular orientation, thus cannot be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

A hand-held vacuum cleaner 100 according to embodiments of the present disclosure will be described with reference to FIGS. 1 to 13. The hand-held vacuum cleaner 100 may be a charging type, a direct current type vacuum cleaner, but it is not limited to this.

As shown in FIG. 1, the hand-held vacuum cleaner 100 according to embodiments of the present disclosure includes a housing 1, a dust cup 2 and an electrical motor 3.

The housing 1 is provided with an air inlet 111 and an air blowing vent 121, and the air blowing vent 121 is disposed adjacent to the air inlet 111. The dust cup 2 is disposed to the housing 1, and the dust cup 2 is connected to the air inlet 111. The electrical motor 3 is provided with an electrical motor chamber 31, the electrical motor chamber 31 is in communication with the dust cup 2, and an airflow entering from the air inlet 111 flows through the dust cup 2 and the electrical motor 3, and flows out through the air blowing vent 121.

Figure 8:
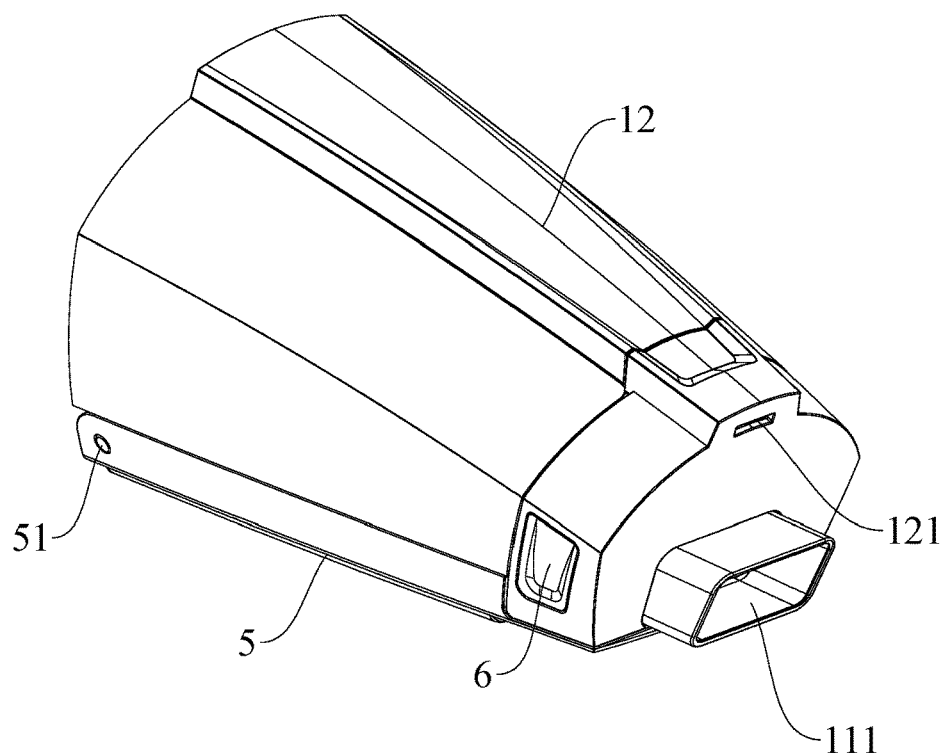
FIG. 8 is a schematic view of a front portion of the hand-held vacuum cleaner shown in FIG. 1, in which an ash pouring plate is in a closed position.
Figure 10:
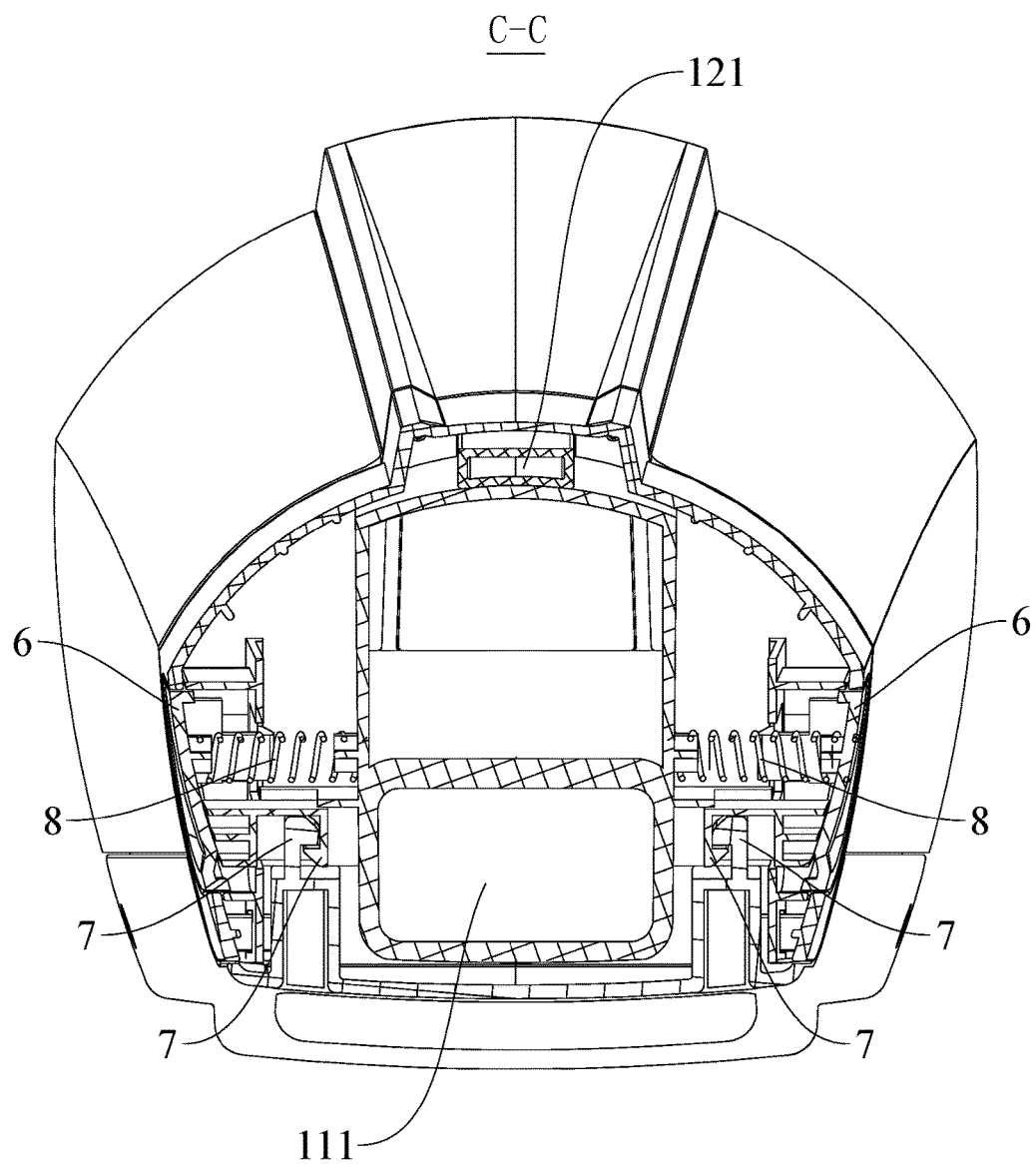
FIG. 10 is a sectional view taken along line C-C in FIG. 9.
Figure 11:
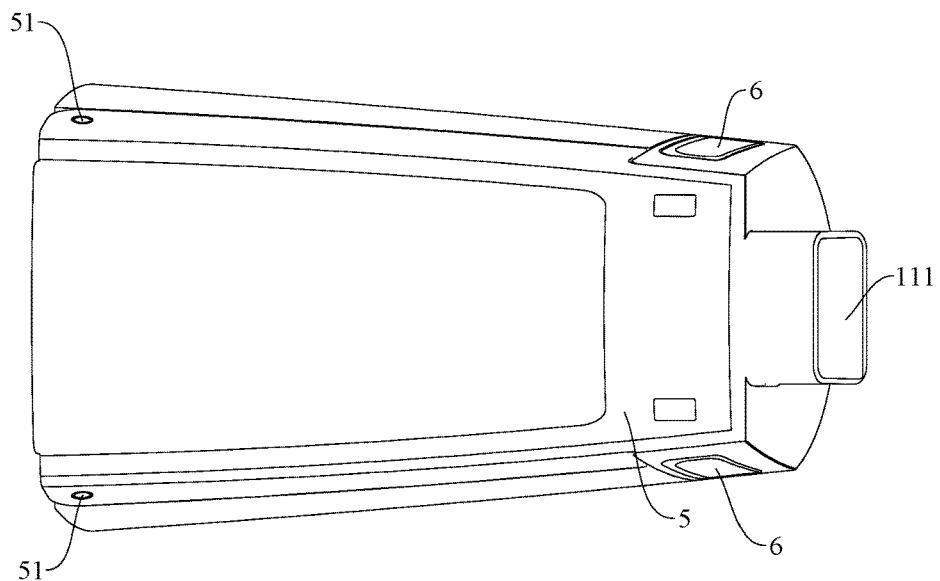
FIG. 11 is a bottom view of the front portion of the hand-held vacuum cleaner shown in FIG. 8.

For example, referring to FIG. 1 in combination with FIGS. 8 and 10, the air inlet 111 and the air blowing vent 121 form substantially a rectangular shape separately, the air inlet 111 and the air blowing vent 121 are both located at a front end of the housing 1 (e.g. a left end in FIG. 1), and the air inlet 111 and the air blowing vent 121 are spaced apart from each other. When the electrical motor 3 is in operation, a negative pressure is produced in the electrical motor chamber 31, so that the dusty gas flow (e.g. dusty airflow, etc.) in the exterior can enter the dust cup 2 through the air inlet 111. The dust and the like in the airflow are separated and collected in the dust cup 2 under the filtration function of the dust cup 2, and the cleaned airflow blows from the air blowing vent 121 through the electrical motor chamber 31. It should be noted herein that the direction "front" refers to a side of the hand-held vacuum cleaner 100 away from the user, and the opposite direction is defined as "rear", namely a side of the hand-held vacuum cleaner 100 held by the user.

Alternatively, the air blowing vent 121 is located above the air inlet 111, but it is not limited to this.

Alternatively, the air blowing vent 121 has a section area smaller than a section area of the air inlet 111. Thus, by providing the air blowing vent 121 sized to be relatively smaller, the airflow blowing from the air blowing vent 121 may flow to a surface to be cleaned at a certain flow rate, so that the dust and the like on the surface to be cleaned may be blown away effectively; by providing the air inlet 111 sized to be relatively larger, the dust and the like blown away may be sucked into the dust cup 2 as much as possible, which has a better cleaning effect and a higher cleaning efficiency.

As shown in FIG. 1, the dust cup 2 is located in front of the electrical motor 3. Certainly, the dust cup 2 may also be located behind the electrical motor 3 (not shown), in which case the electrical motor 3 is located between the air inlet 111 and the dust cup 2, thus increasing the diversity of the structure of the hand-held vacuum cleaner 100. It should be understood that the specific position of the dust cup 2 and the electrical motor 3 may be adaptively changed according to practical requirements, which is not specifically restricted by the present disclosure.

When the hand-held vacuum cleaner 100 cleans a narrowly structured place (e.g. a keyboard and the like), the airflow blowing from the air blowing vent 121 can enter narrow gaps of the keyboard and the like and can blow away the dust and the like at the narrow gaps, and the dust and the like blown away can be sucked into the housing 1 from the air inlet 111 and collected in the dust cup 2 under the effect of the negative pressure in the electrical motor chamber 31. Thus, the cleaning of the narrowly structured place (e.g. the keyboard and the like) is greatly facilitated, which saves time and effort, and has a good cleaning effect.

In the hand-held vacuum cleaner 100 according to embodiments of the present disclosure, by providing the air blowing vent 121 and making the air blowing vent 121 adjacent to the air inlet 111, the cleaning of narrow gaps is greatly facilitated, and the cleaning effect is good.

According to an embodiment of the present disclosure, as shown in FIG. 1, the air blowing vent 121 extends obliquely in a direction of the air inlet 111. In this case a central axis of the air blowing vent 121 intersects a central axis of the air inlet 111, and the intersection point is located outside the housing 1. Preferably, the intersection point is located at the surface to be cleaned (for example, the surface of the keyboard where the dust is). Thus, the air inlet 111 may better suck the dust and the like blown away at the air blowing vent 121 into the dust cup 2, which has a good dust suction effect.

According to an embodiment of the present disclosure, the housing 1 is provided with an air inlet pipe 11. For example, referring to FIG. 1, the air inlet pipe 11 extends horizontally, and an end of the air inlet pipe 11 (for example, a left end in FIG. 1, namely the free end) extends outside the housing 1. The air inlet 111 is formed in the free end of the air inlet pipe 11, in which case the air inlet 111 is located in front of the air blowing vent 121.

Alternatively, in a flow direction of the airflow passing through the air inlet pipe 11, an end surface of the free end of the air inlet pipe 11 extends obliquely in a direction away from the air blowing vent 121. For example, as shown in FIG. 1, the end surface of the left end of the air inlet pipe 11 extends downwardly and obliquely in a left-to-right direction. Thus, the airflow blowing from the air blowing vent 121 can better blow the surface to be cleaned, and is not easy to directly return into the dust cup 2 through the air inlet 111.

Further, the end surface of the foregoing free end of the air inlet pipe 11 is formed as an inclined plane, thus enabling a simple processing and a low cost. Certainly, the end surface of the foregoing free end of the air inlet pipe 11 may also be formed as an inclined curved surface (not shown), for example, being formed as an inclined cambered surface and the like concave in a direction of the center of the housing 1.

According to an specific embodiment of the present disclosure, an air blowing channel 12 is provided in the housing 1, an end of the air blowing channel 12 (for example, a right end in FIG. 1) is in communication with the electrical motor chamber 31, and the other end of the air blowing channel 12 (for example, a left end in FIG. 1) has the air blowing vent 121. Thus, the airflow in the electrical motor chamber 31 may be conveyed to the air blowing vent 121 through the air blowing channel 12.

For example, as shown in FIG. 1, the air blowing channel 12 is located at a top portion of the housing 1. The air blowing channel 12 extends in a front-and-rear direction. A rear end of the air blowing channel 12 is in communication with the electrical motor chamber 31. The air blowing vent 121 is formed in a front end of the air blowing channel 12 and is located directly above the air inlet 111, the air blowing channel 12 extends obliquely and downwardly in a rear-to-front direction, in which case a distance between the air blowing channel 12 and the air inlet 111 is gradually reduced along the flow direction of the airflow passing through the air blowing channel 12, so that the airflow blowing from the air blowing vent 121 can blow the surface to be cleaned opposite to the air inlet 111, and further the dust and the like blown away from the surface to be cleaned may be better sucked into the dust cup 2 through the air inlet 111.

Alternatively, the air blowing channel 12 extends linearly in a front-and-rear direction, as shown in FIG. 1, thus, the airflow in the electrical motor chamber 31 may better flow to the air blowing vent 121 through the linear air blowing channel 12, so that the dust and the like on the surface to be cleaned may be better blown away. Certainly, the air blowing channel 12 may also extend in a curve (for example, a wavy line or an arc, etc.) along the front-and-rear direction. Further, the air blowing channel 12 preferably has a section area gradually reducing in the flow direction of the airflow passing through the air blowing channel 12, as shown in FIGS. 8 and 10, thus, when the airflow flows through the air blowing vent 121, the flow rate is increased, so that the airflow may flow to the surface to be cleaned at a relatively higher flow rate, and further the dust and the like on the surface to be cleaned may be effectively blown away.

It should be understood that the position, shape, and size, and so on of the air blowing channel 12 may be specifically provided according to practical requirements so as to better meet the practical requirements.

Alternatively, various pipes of the hand-held vacuum cleaner 100 are connected to each other by ultrasonic welding. "Various pipes" refers to various individual pipes where the airflow passes in the flow direction of the airflow. For example, the connection form between the air inlet pipe 11 and an air intake channel 211 of a first cyclone of the dust cup 2 is ultrasonic welding. Thus, high welding speed, high welding strength, and good sealing is ensured by using the ultrasonic welding form.

According to an embodiment of the present disclosure, the housing 1 is provided with an air outlet 311. As an example shown in FIG. 1, the air outlet 311 is located at a side of the electrical motor 3 away from the air inlet 111, the air outlet 311 is in communication with the electrical motor chamber 31, so that after the dusty airflow entering from the air inlet 111 flowing through the dust cup 2 and being filtered in the dust cup 2, the cleaned airflow can flow through the electrical motor chamber 31 and be discharged from the air outlet 311.

The airflow entering from the air inlet 111 flows through the dust cup 2 and the electrical motor 3, and then flows out through at least one of the air outlet 311 and the air blowing vent 121. That is to say, the airflow entering via the air inlet 111 may only flow out through the air outlet 311, or only flow out through the air blowing vent 121, or flow out through the air outlet 311 and the air blowing vent 121 at the same time. For example, the airflow entering via the air inlet 111 flows through the dust cup 2 and the electrical motor 3, and then switchably flows out through at least one of the air outlet 311 and the air blowing vent 121 by means of a switching mechanism 4.

For example, when the hand-held vacuum cleaner 100 is in a normal operation (cleaning a place having large space, such as a bed sheet, a curtain, etc.), the air blowing vent 121 is not required to blow away the dust and the like on the surface to be cleaned, in this case, the air blowing vent 121 may be closed. Under the effect of the negative pressure of the electrical motor 3, the dust and the like on the surface to be cleaned sucked from the air inlet 111 are filtered by the dust cup 2, the dust and the like are collected in the dust cup 2, and the cleaned airflow may be discharged from the air outlet 311 passing through the electrical motor chamber 31.

When the hand-held vacuum cleaner 100 cleans a narrowly structured place (e.g. a keyboard and the like), the air blowing vent 121 is communicated with the electrical motor chamber 31, so that the airflow blowing from the air blowing vent 121 can blow into narrow gaps of the keyboard and the like and can blow away the dust and the like at the narrow gaps, and the dust and the like blown away may be sucked into the dust cup 2 through the air inlet 111 under the effect of the negative pressure of the electrical motor 3, the dusty airflow sucked is filtered by the dust cup 2, and the dust and the like filtered out are collected in the dust cup 2, while the cleaned airflow flows to the air blowing vent 121 through the electrical motor chamber 31 to continue to blow away the dust on the keyboard and the like. In this case, the air outlet 311 may be fully closed, certainly, the air outlet 311 may also be slightly opened, but it should be ensured that most of the airflow blows towards the air blowing vent 121.

According to an embodiment of the present disclosure, the air blowing vent 121 is switchably communicated with the electrical motor chamber 31. When the air blowing vent 121 is in communication with the electrical motor chamber 31, the airflow in the electrical motor chamber 31 may flow to the air blowing vent 121. When the air blowing vent 121 is isolated from the electrical motor chamber 31, the airflow in the electrical motor chamber 31 cannot flow to the air blowing vent 121.

For example, the air blowing vent 121 may be switchably communicated with the electrical motor chamber 31 by means of the switching mechanism 4, and the switching mechanism 4 is configured to be movable between a communication position communicating the air blowing vent 121 and the electrical motor chamber 31 and an isolation position isolating the air blowing vent 121 from the electrical motor chamber 31. When the switching mechanism 4 is in the communication position, the air blowing vent 121 is in communication with the electrical motor chamber 31, the cleaned airflow may blow the surface to be cleaned through the air blowing vent 121, in this case, the narrowly structured place (e.g. the keyboard and the like) may be cleaned by the hand-held vacuum cleaner 100. When switching mechanism 4 is in the isolation position, the air blowing vent 121 is isolated from the electrical motor chamber 31, and the airflow in the electrical motor chamber 31 cannot blow from the air blowing vent 121.

Further, when the switching mechanism 4 is in the communication position, the switching mechanism 4 closes or partially closes the air outlet 311. When the switching mechanism 4 closes the air outlet 311, that is, the switching mechanism 4 fully closes the air outlet 311, the airflow in the electrical motor chamber 31 cannot flow out through the air outlet 311; when the switching mechanism 4 partially closes the air outlet 311, that is, a part of the airflow in the electrical motor chamber 31 can flow out through the air outlet 311. It should be noted herein that, "partially close" may be construed to mean that the switching mechanism 4 closes a portion of the air outlet 311; or a distance between the switching mechanism 4 and at least a portion of the air outlet 311 is small, in this case, most of the airflow in the electrical motor chamber 31 blows from the air blowing vent 121, while only a small part of the airflow flows out through the air outlet 311. When the switching mechanism 4 is in the isolation position, the air outlet 311 is in communication with the electrical motor chamber 31, so that the surface to be cleaned can be continuously cleaned when the hand-held vacuum cleaner 100 is in a normal operation.

Figure 2:
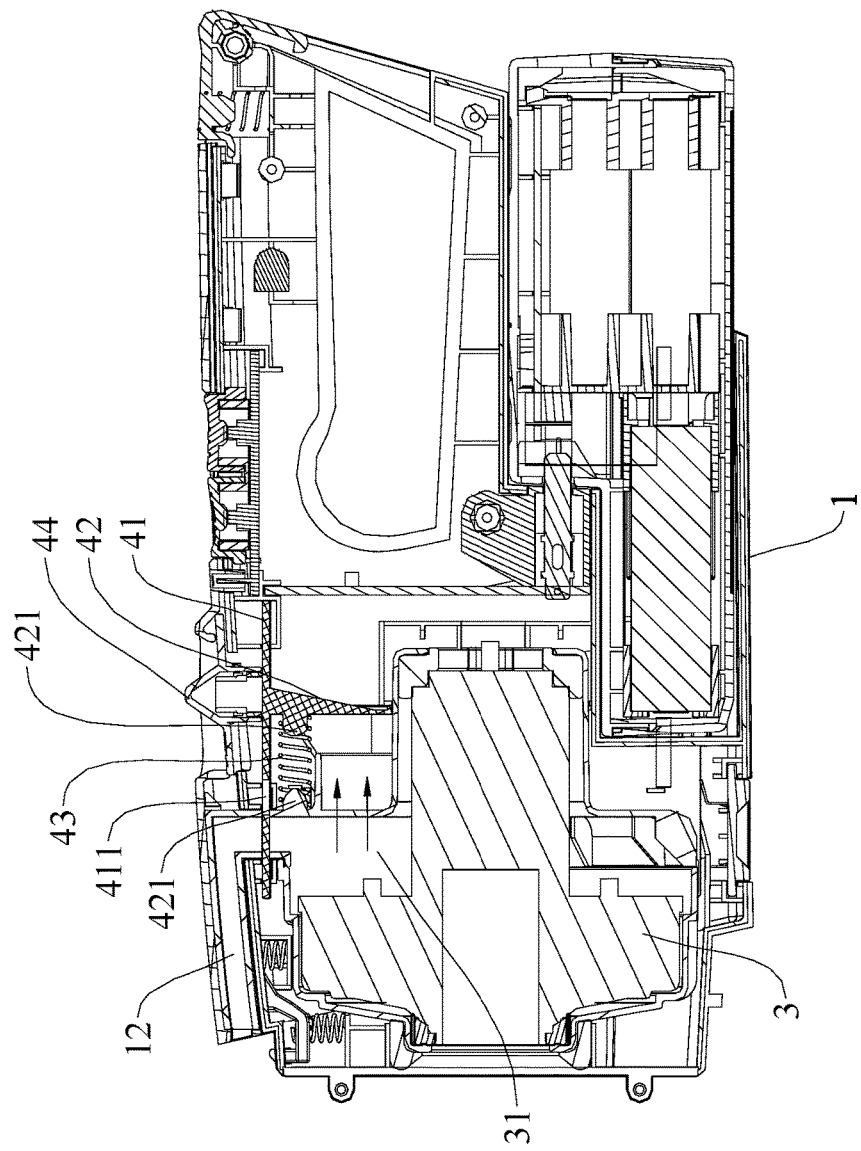
FIG. 2 is a partially schematic view of the hand-held vacuum cleaner shown in FIG. 1, in which a switching mechanism is in an isolation position.
Figure 3:
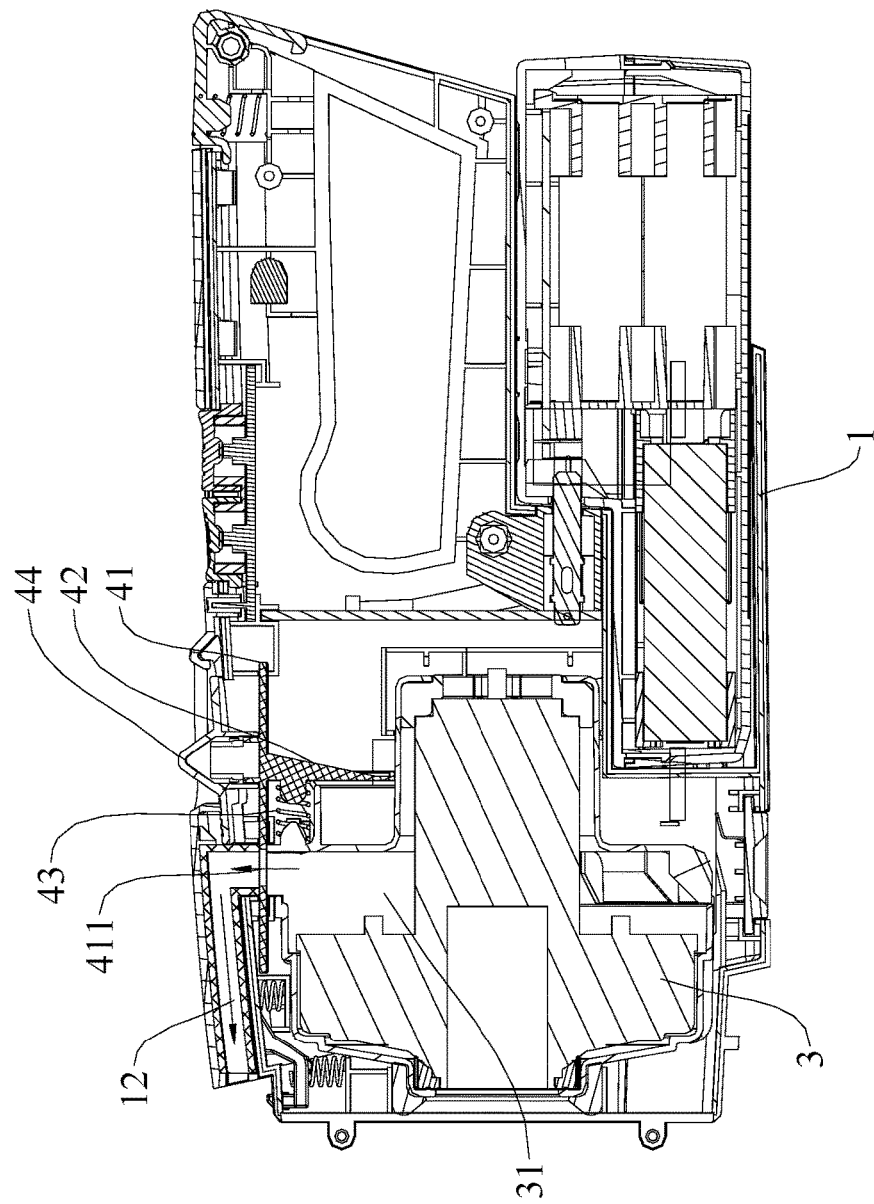
FIG. 3 is another partially schematic view of the hand-held vacuum cleaner shown in FIG. 1, in which a switching mechanism is in a communication position.
Figure 4:
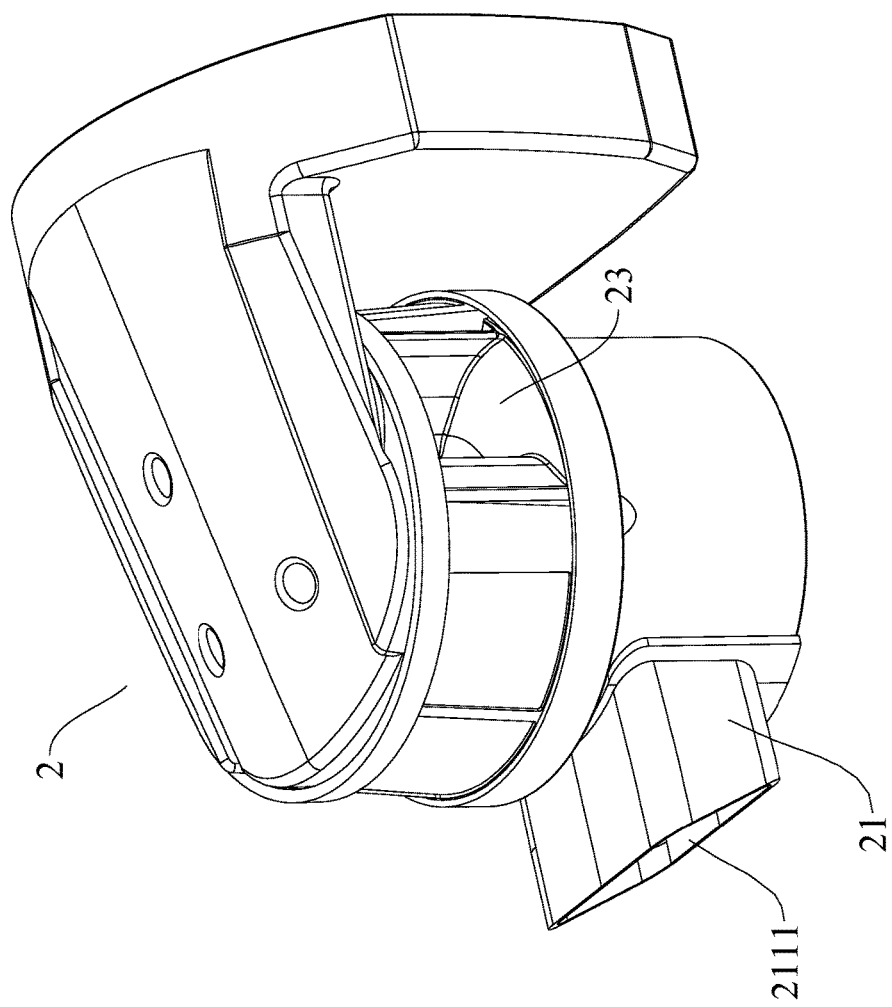
FIG. 4 is a perspective view of a dust cup shown in FIG. 1.

Specifically, as shown in FIGS. 1 to 3, the switching mechanism 4 includes a push plate 41, the push plate 41 is movably disposed to the housing 1, a communicating opening 411 is formed in the push plate 41, and the communicating opening 411 communicates the air blowing vent 121 with the electrical motor chamber 31 when the switching mechanism 4 is in the communication position.

For example, referring to FIG. 1 in combination with FIGS. 2 and 3, the push plate 41 may extend in the front-and-rear direction, for example, the push plate 41 extends horizontally in the front-and-rear direction, so that the push plate 41 may move horizontally in the front-and-rear direction. An opening in a rear end of the air blowing channel 12 and an opening of the electrical motor chamber 31 for communicating with the air blowing channel 12 are opposite to each other in an up-and-down direction, in this case, the push plate 41 is located between the opening in the rear end of the air blowing channel 12 and the forgoing opening of the electrical motor chamber 31. When the hand-held vacuum cleaner 100 is in the normal operation, the switching mechanism 4 is in the isolation position, the communicating opening 411 and the air blowing vent 121 as well as the electrical motor chamber 31 are staggered, the push plate 41 closes the forgoing opening of the electrical motor chamber 31, and the push plate 41 isolates the air blowing vent 121 from the electrical motor chamber 31, so that the airflow in the electrical motor chamber 31 will not blow from the air blowing vent 121 (as shown in FIG. 2). When the narrowly structured place (e.g. the keyboard) is required to be cleaned, the push plate 41 may be moved to make the communicating opening 411, the opening in the rear end of the air blowing channel 12 and the forgoing opening of the electrical motor chamber 31 opposite to each other in the up-and-down direction, so that the airflow in the electrical motor chamber 31 may enter the air blowing channel 12 through the communicating opening 411 and may blow from the air blowing vent 121.

The air outlet 311 is formed at the electrical motor chamber 31 and is located below the push plate 41. As shown in FIGS. 2 and 3, the push plate 41 is provided with a closing plate 42, the closing plate 42 extends downwardly and vertically from a lower surface of the push plate 41, and the closing plate 41 is opposite to the air outlet 311. When the switching mechanism 4 is in the communication position, the closing plate 41 closes or partially closes the air outlet 311. Further, when the closing plate 42 partially closes the air outlet 311, a gap is presented between the closing plate 42 and the air outlet 311, or the closing plate 42 closes a portion of the air outlet 311. Thus, while ensuring the air blowing effect, the accuracy of manufacturing of the closing plate 42 is reduced, and the cost is saved. Alternatively, the closing plate 42 is configured to have a thickness gradually increasing from bottom to top, which effectively ensures the structural strength of the closing plate 42.

Further, the switching mechanism 4 further includes a resetting member 43, the resetting member 43 is disposed between the housing 1 and the push plate 41, and the resetting member 43 normally pushes the push plate 41 in a direction of the isolation position. Alternatively, the resetting member 43 is a spring. For example, as shown in FIGS. 2 and 3, the spring is disposed between the electrical motor 3 and the closing plate 42 and is located in front of the closing plate 42, and the spring normally pushes the closing plate 42 rearward so that the push plate 41 is normally maintained in the isolation position isolating the air blowing vent 121 from the electrical motor chamber 31. That is, the hand-held vacuum cleaner 100 is normally in a normal operation state.

In order to allow the push plate 41 to be steadily moved in the front-and-rear direction, the electrical motor 3 and the closing plate 42 may be provided with a positioning post 421 separately, two ends of the spring may be fitted over the respective positioning post 421 separately. Alternatively, a free end of the positioning post 421 is formed as a circular boss shape, a conical shape or a semispherical shape, etc., so as to facilitate the mounting of the spring.

As shown in FIGS. 1 to 3, the push plate 41 is provided with a push button 44, the push button 44 is disposed to an upper surface of the push plate 41, and the push button 44 is exposed out of an upper surface of the housing 1. Thus, the user can push the push button 44 to achieve the movement of the push plate 41 between the communication position and the isolation position. Alternatively, the push button 41 is a hollow structure to save the materials and reduce the cost.

The hand-held vacuum cleaner 100 is in the isolation position shown in FIG. 2 in a normal state, in this case the push plate 41 isolates the air blowing vent 121 from the electrical motor chamber 31, and the closing plate 42 opens the air outlet 311, and the push plate 41 is maintained in this position under the effect of an elastic force of the spring. When the narrowly structured place (e.g. the keyboard) is required to be cleaned, the push button 44 may be jogged forward to move the push plate 41 forward, when the push plate 41 is pushed to the communication position, the communicating opening 411 communicates the electrical motor chamber 31 with the air blowing channel 12, and the closing plate 42 is moved forward to a position where a certain gap exists between the closing plate 42 and the air outlet 311, so that most of the airflow in the electrical motor chamber 31 may blow from the air blowing vent 121 through the air blowing channel 12, and further the narrow gaps may be better cleaned, while a small part of the airflow flows out through the air outlet 311 via the gap between the air outlet 311 and the closing plate 42, as shown in FIG. 3.

Thus, by providing the switching mechanism 4, in the conditioned that the normal use of the hand-held vacuum cleaner 100 is ensured, the airflow discharged from the air outlet 311 may be effectively used, and further the cleaning effect of the hand-held vacuum cleaner 100 is enhanced.

According to an embodiment of the present disclosure, as shown in FIGS. 4 to 7, the dust cup 2 includes a cup body, a first cyclone, a cyclone assembly and a filtration member. The first cyclone, the cyclone assembly and the filtration member are all disposed in the cup body, the first cyclone has the air intake channel 211, and the air intake channel 211 has an air intake 2111 and an air vent 2112.

Figure 5:
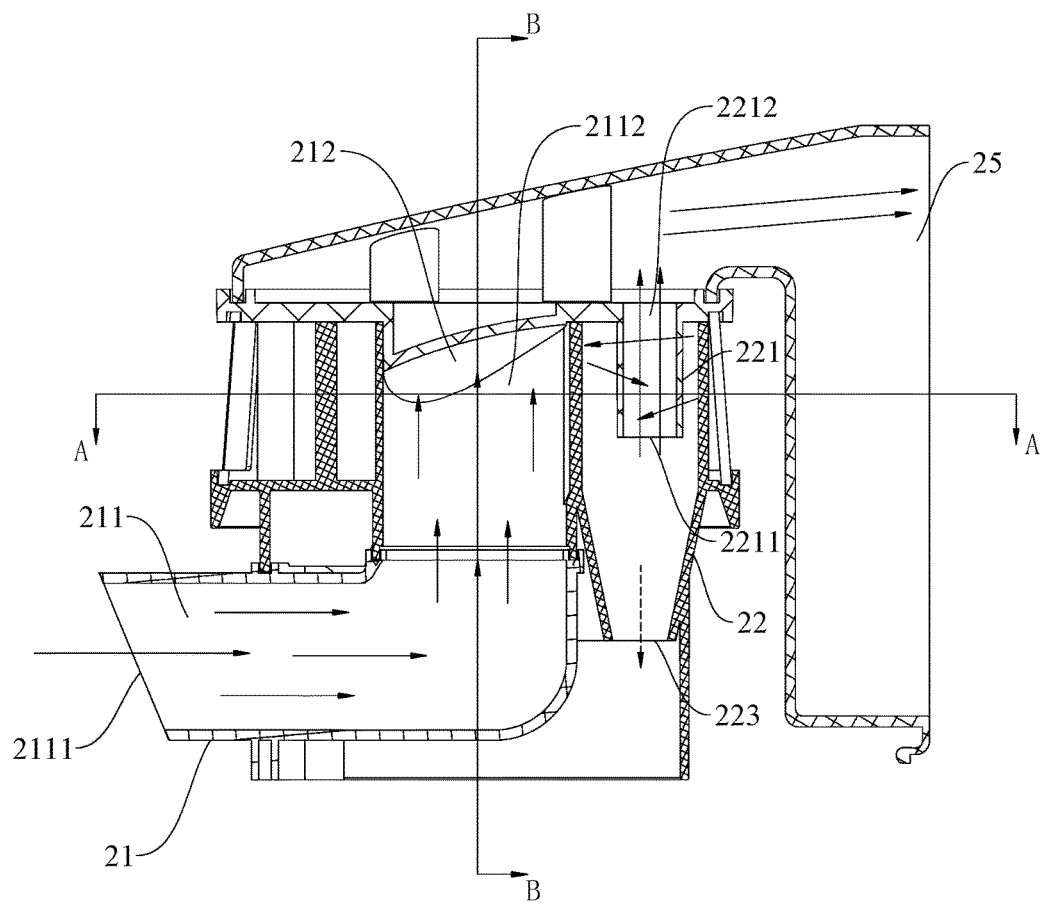
FIG. 5 is a longitudinally sectional view of a dust cup shown in FIG. 4.
Figure 6:
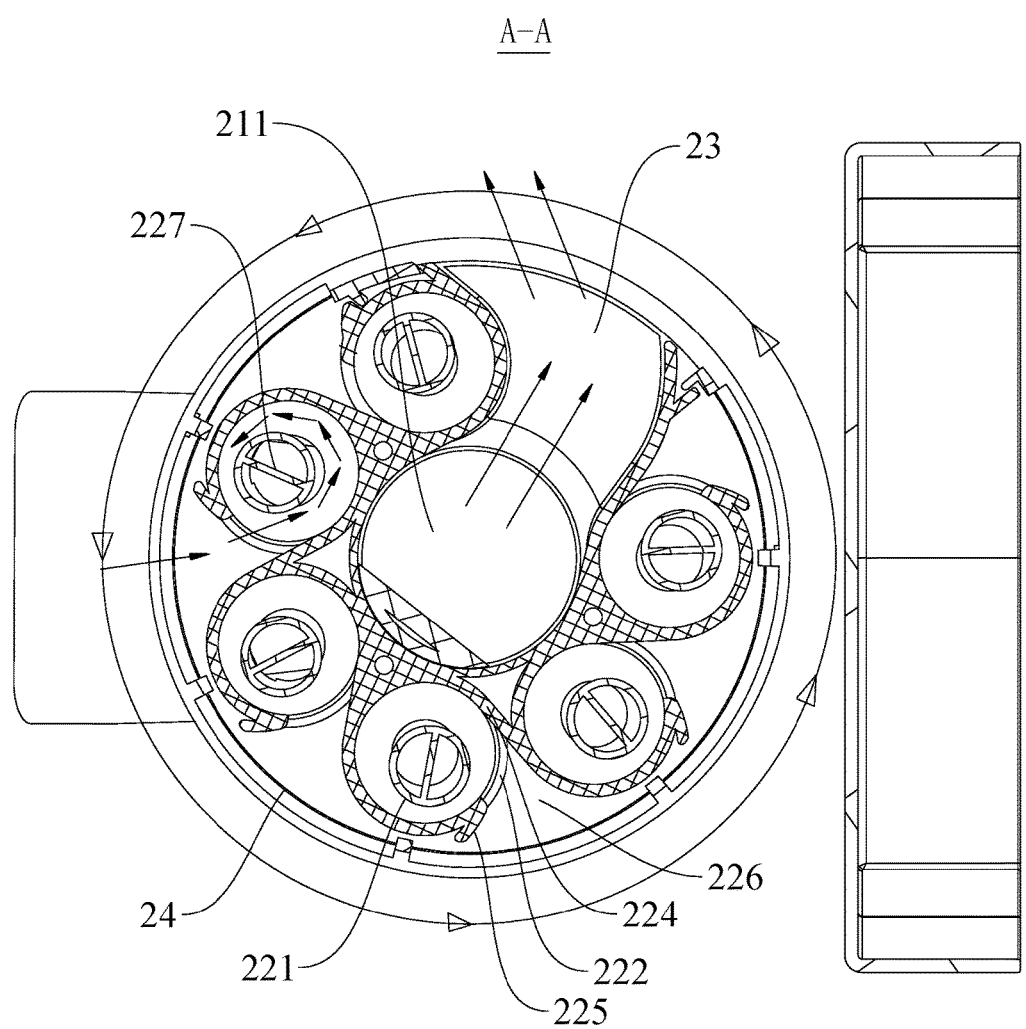
FIG. 6 is a sectional view taken along line A-A in FIG. 5.
Figure 7:
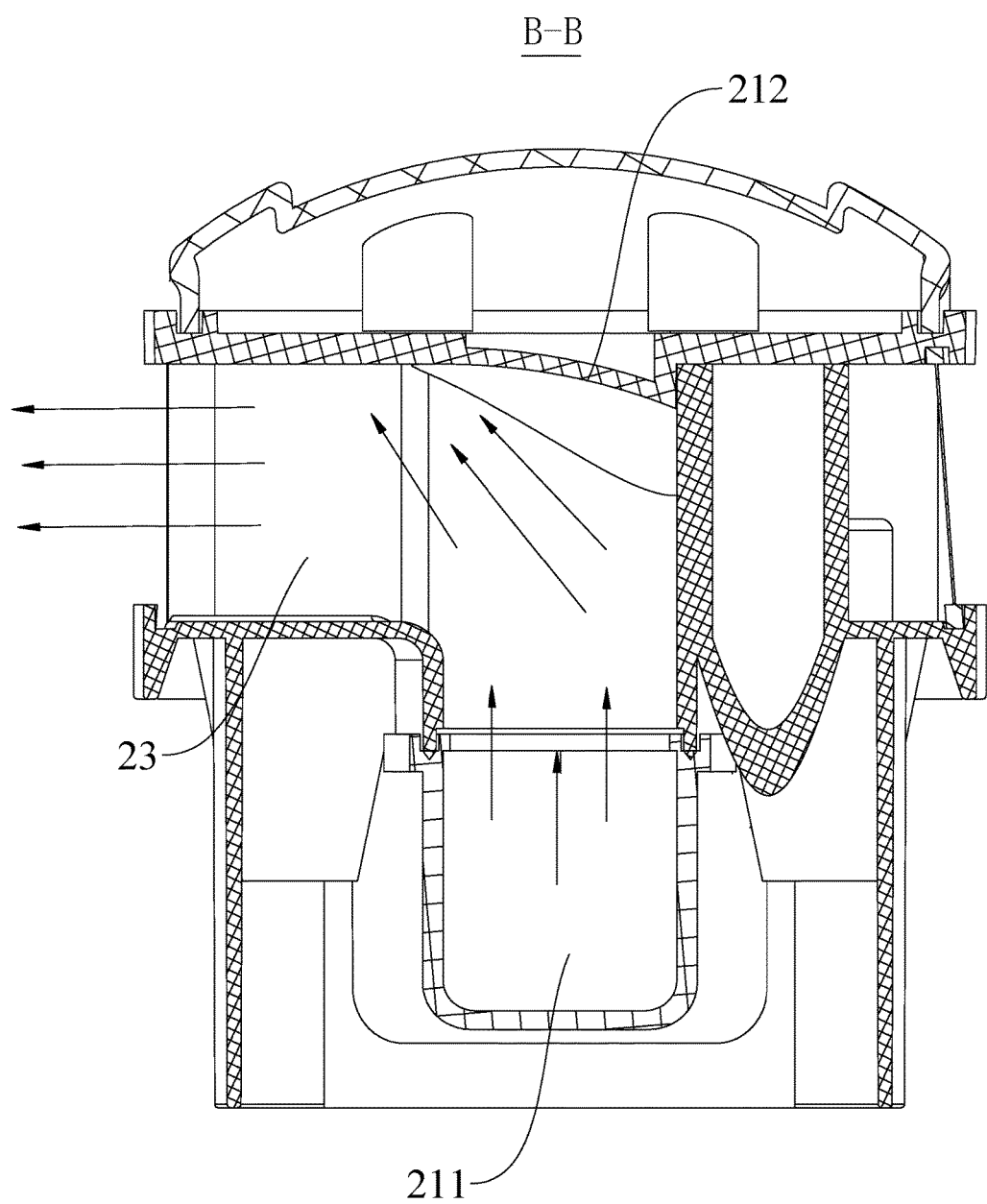
FIG. 7 is a sectional view taken along line B-B in FIG. 5.

Referring to FIGS. 5 to 7, the cyclone assembly includes a plurality of second cyclones 22, the plurality of the second cyclones are arranged in parallel in a circumferential direction of the first cyclone. A guiding channel 23 is defined between two of the plurality of the second cyclones 22, and the guiding channel 23 is in communication with the air vent 2112 and the airflow is guided to an outer circumference of the cyclone assembly by the guiding channel 23 along a tangent line to a circumferential wall of the second cyclone 22 adjacent to the guiding channel. A first cyclone separation space A configured to purify and separate the airflow is defined between an outer circumferential wall of the cyclone assembly and an inner wall of the cup body, so that when the airflow to be cleaned enters via the air intake channel 211 and is tangentially guided into the first cyclone separation space A through the guiding channel 23, the airflow may be preliminarily separated, and further the larger particles or dirt in the airflow will be separated and fall. Specifically, an end of the air intake channel 211 is in communication with the air inlet 111, the other end of the air intake channel 211 is in communication with an end of the guiding channel 23, the other end of the guiding channel 23 is in communication with the first cyclone separation space A, and the airflow introduced from the guiding channel 23 enters the first cyclone separation space A along the tangent direction in which the purification and separation is achieved in the first cyclone separation space A.

As shown in FIG. 6, each of the second cyclones 22 has an air inducing notch 222, so that the airflow may enter the second cyclone 22 along the tangent direction. Each of the second cyclones 22 is provided with an air guiding pipe 221 therein, and the air guiding pipe 221 and an inner circumferential wall of the second cyclone 22 are spaced apart from each other. The air guiding pipe 221 has an air guiding inlet 2211 and an air guiding outlet 2212, the air guiding inlet 2211 is in communication with the air inducing notch 222, so that the airflow separated preliminarily may enter the plurality of second cyclones 22 through the air inducing notch 222, and may be discharged from the air guiding pipe 221 after further purification and separation in the second cyclone 22. A filtration member is disposed along the outer circumference of the cyclone assembly, so that the airflow in the outer circumference of the cyclone assembly may tangentially enter the second cyclone 22 (each of the second cyclone 22 defines a second cyclone separation space B therein) through the filtration member and the air inducing notch 222. That is, the airflow is further purified and separated in the second cyclone separation space B. Thus, after the preliminary separation in the first cyclone separation space A, the airflow purified preliminarily enters the plurality of the second cyclones 22 through the filtration member and the air inducing notch 222 sequentially to be purified and separated further. The airflow in the second cyclone separation space B rotates around the air guiding pipe 221, the dust and the like separated falls, the airflow purified further enters the air guiding pipe 221 through the air guiding inlet 2211, and is discharged out of the second cyclone 22 through the air guiding outlet 2212.

Since the plurality of the second cyclones 22 are arranged in parallel circumferentially around a longitudinal axis of the first cyclone, the airflow purified preliminarily may be dispersed and enter the plurality of the second cyclones 22 in parallel, so as to carry out the cyclone separation in the plurality of the second cyclones 22 separately.

Further, an outlet filtration member is disposed between the dust cup 2 and the electrical motor 3. As shown in FIG. 1, the outlet filtration member is located at an outlet of the dust cup 2, and the outlet filtration member is located downstream of the plurality of the second cyclones 22. Thus, the airflow further purified and separated by the plurality of the second cyclones 22 may be purified further by the outlet filtration member. It should be noted herein that, the "downstream" may be construed as the downstream of the flow direction of the airflow passing through the dust cup 2.

Alternatively, the filtration member is a HEPA (High efficiency particulate air Filter) member, or filter cotton, etc.

Thus, the dusty airflow entering the dust cup 2 is purified and separated by using the cyclone separation technologies, and the smooth of the flowing of the airflow in the dust cup 2 can be effectively ensured. Moreover, by providing the first cyclone, the filtration member and the plurality of the second cyclones 22, the two stage cyclone separation is performed by using the first cyclone and the plurality of the second cyclones 22, the large particles or dirt in the airflow may be first filtered by the first cyclone and the filtration member, while most of small particles (for example, the dust particles) in the airflow purified preliminarily are separated by the plurality of the second cyclones 22, and finally small part of fine dust is filtered by the outlet filtration member, which has a good dust-air separation effect.

The airflow is purified by the filtration member during flowing from the first cyclone separation space A to the second cyclone separation space B. Preferably, the filtration member is removably disposed in the outer circumference of the cyclone assembly, so that the filtration member may be removed to be cleaned after being used for a period of time.

By providing the air guiding pipe 221 in the second cyclone 22, the residence time of the airflow in the second cyclone 22 is prolonged, so that the airflow to be cleaned entering the second cyclone 22 may be better cleaned.

Alternatively, as shown in FIGS. 5 and 6, the air guiding pipe 221 is disposed eccentrically relative to the second cyclone 22. That is to say, a central axis of the air guiding pipe 221 deviates from a central axis of the second cyclone 22, or the central axis of the air guiding pipe 221 does not coincides with the central axis of the second cyclone 22. That is, distances between an outer circumferential wall of the air guiding pipe 221 and portions of the inner circumferential wall of the second cyclone 22 may be longer or shorter, so that the airflow separated preliminarily may first tangentially enter a side where the distance between the outer circumferential wall of the air guiding pipe 221 and the inner circumferential wall of the second cyclone 22 is longer, and then may rotate around the air guiding pipe 221 to a side where the distance is shorter, thus, it is effectively ensured that the airflow entering the second cyclone 22 may rotate in the same direction (for example, a counterclockwise direction in FIG. 6) to be purified and separated.

For example, as shown in FIGS. 5 and 6, the air guiding pipe 221 is a round pipe, the air guiding pipe 221 extends vertically, the air guiding pipe 221 is located in an upper portion of the second cyclone 22, an upper end of the air guiding pipe 221 is connected to a top wall of the second cyclone 22 and has the air guiding outlet 2212, and a lower end of the air guiding pipe 221 has the air guiding inlet 2211. The air inducing notch 222 is located at the upper portion of the second cyclone 22. The airflow entering the second cyclone 22 starts to rotate around the upper end of the air guiding pipe 221 and moves downward gradually (as shown in FIG. 5) to form a rotary downdraft, the rotary downdraft descends to the lower end of the air guiding pipe 221 to become an updraft, the dust in the airflow is separated from the airflow and falls downward, while the cleaner airflow enters the air guiding pipe 221 and is discharged from the air guiding outlet 2212 in the upper end of the air guiding pipe 221.

Further, as shown in FIG. 6, the air guiding pipe 221 is provided with a separating plate 227 therein, and the separating plate 227 divides an interior of the air guiding pipe 221 into two chambers. Thus, by providing the separating plate 227, the dust and the like in the airflow entering the air guiding pipe 221 may be further separated. Alternatively, the separating plate 227 is disposed in the air guiding pipe 221 vertically or obliquely.

The rotation direction of the airflow in the outer circumference of the cyclone assembly is preferably the same as the rotation direction of the airflow in the second cyclone 22. As shown in FIG. 6, the rotation direction of the airflow in the outer circumference of the cyclone assembly and the rotation direction of the airflow, subsequently entering the second cyclone 22, in the second cyclone 22 are both counterclockwise directions. Thus, turbulence of the airflow in the dust cup 2 is prevented, and better separation effect of the dust cup 2 is ensured.

Referring to FIG. 6, the filtration member is disposed surrounding the cyclone assembly, an avoiding notch is formed in the filtration member, and the avoiding notch is opposite to the guiding channel 23. Thus, the airflow flowing through the guiding channel 23 may directly flow to the outer circumference of the cyclone assembly through the avoiding notch, and the airflow needs to pass through the filtration member first before entering the second cyclone 22, so that not only the filtration effect is ensured, but also the smooth of the flowing of the airflow is ensured. For example, the filtration member may be substantially C-shaped.

Certainly, a plurality of filtration members may be provided, and the plurality of filtration members correspond to air inducing notches 22 of the plurality of second cyclones 22 separately. Each filtration member is disposed corresponding to one or plurality of air inducing notches 222, thus, the airflow purified preliminarily in the first cyclone separation space A directly and tangentially enters the second cyclone 22 via the air inducing notch 222 after passing through the filtration member so as to be separated, so that the large particles can be filtered first before the further separation in the second cyclone 22, which further improves the purification and separation effect.

Alternatively, the forgoing filtration member may be a filter mesh (not shown). Certainly, the filtration member may also be an inserting sheet having a filtration hole. The mesh hole or the filtration hole of the filter mesh may be configured to be distributed in multilayer annular shapes, or distributed evenly in a multi-row and multi-column form, so as to facilitate the even filtration. In addition, the size range of the mesh hole or the filtration hole of the filter mesh is not restricted, the filtration effect is good if the size is relatively smaller, and the air discharging efficiency is high and the energy loss of the electrical motor 3 is small if the size is relatively larger. The suitable size can be selected according to the performance requirements of the product in the practical application.

As shown in FIG. 6, a connecting wall 224 tangent to a side wall of the second cyclone 22 is connected to a side of the air inducing notch 222 of each second cyclone 22, and an extension part 225 extends out from the other side of the air inducing notch 222, and an air inducing channel 226 in a tangent direction is defined between the extension part 225 and the connecting wall 224. Alternatively, the connecting wall 224 of each of the plurality of the second cyclones 22 extends and tangentially connected to the side wall of the second cyclone 22 adjacent thereto, in which, in a flow direction of the airflow passing through the air inducing channel 226, the extension part 225 extends in a direction of the corresponding connecting wall 224, in this case, the air inducing channel 226 is configured to have a width gradually reducing in a flow direction of the airflow passing through the air inducing channel 226. Thus, the airflow in the outer circumference of the cyclone assembly may more smoothly enter the second cyclone 22 in a tangent direction of the second cyclone 22 through the air inducing channel 226 so as to perform the cyclone separation, which has a better separation effect.

As shown in FIGS. 5 and 7, an inner wall of an end of the air intake channel 211 having the air vent 2112 has a guiding surface configured to guide the airflow in the air intake channel 211 to the guiding channel 23. Thus, the airflow passing through the air intake channel 211 may be better guided to the guiding channel 23 under the effect of the guiding surface. For example, referring to FIGS. 5 and 7, the air intake channel 211 is defined by the air intake pipe 21, and the air intake 2111 and the air vent 2112 of the air intake channel 211 are defined separately by the lower end and the upper end of the air intake pipe 21. The air intake pipe 21 includes a horizontal pipe segment and a vertical pipe segment connected to each other, a free end of the horizontal pipe segment (for example, a left end in FIG. 5) is in communication with the air inlet 111, a free end of the vertical pipe segment (for example, an upper end in FIG. 5) is in communication with the guiding channel 23. The guiding surface is located at a top wall of the free end of the vertical pipe segment, when passing through the guiding surface, the airflow may be better guided into the guiding channel 23 under the effect of the guiding surface. For example, preferably, the guiding surface is formed as a curved surface.

Alternatively, as shown in FIG. 6, the guiding channel 23 is configured to have a width gradually increasing along the flow direction of the airflow. Thus, the airflow passing through the guiding channel 23 may be better guided to the outer circumference of the cyclone assembly under the guiding function of the guiding channel 23.

Alternatively, an opening 223 is formed in a bottom of each second cyclone 22. The small particles and the like separated by the second cyclone 22 may fall below the second cyclone 22 through the opening 223 in the bottom of the second cyclone 22, the collection of the small particles and the like is facilitated, and the small particles and the like, which has been separated, will not be raised when the airflow is cyclonically separated in the second cyclone 22.

Various components of the dust cup 2 may be connected to each other by ultrasonic welding.

Thus, by using the forgoing dust cup 2, the dust-air separation function of the dust cup 2 is enhanced, so that most of the dust is thrown away from the airflow before flowing to the outlet filtration member, only a small amount of dust enters the outlet filtration member, accordingly, the outlet filtration member is effectively prevented from being clogged by a lot of dust, the cleaning period of the outlet filtration member is reduced, the service life of the outlet filtration member is extended, and meanwhile the load of the electrical motor 3 is reduced.

According to an embodiment of the present disclosure, a bottom of the first cyclone separation space A is opened to constitute an opening of the bottom of the first cyclone separation space A, and the bottom of each second cyclone 22 has the forgoing opening 223, a dust outlet is formed in a bottom of the dust cup 2, and the dust outlet is constituted by the opening of the bottom of the first cyclone separation space A and the opening 223 of the bottom of the second cyclone together.

Figure 9:
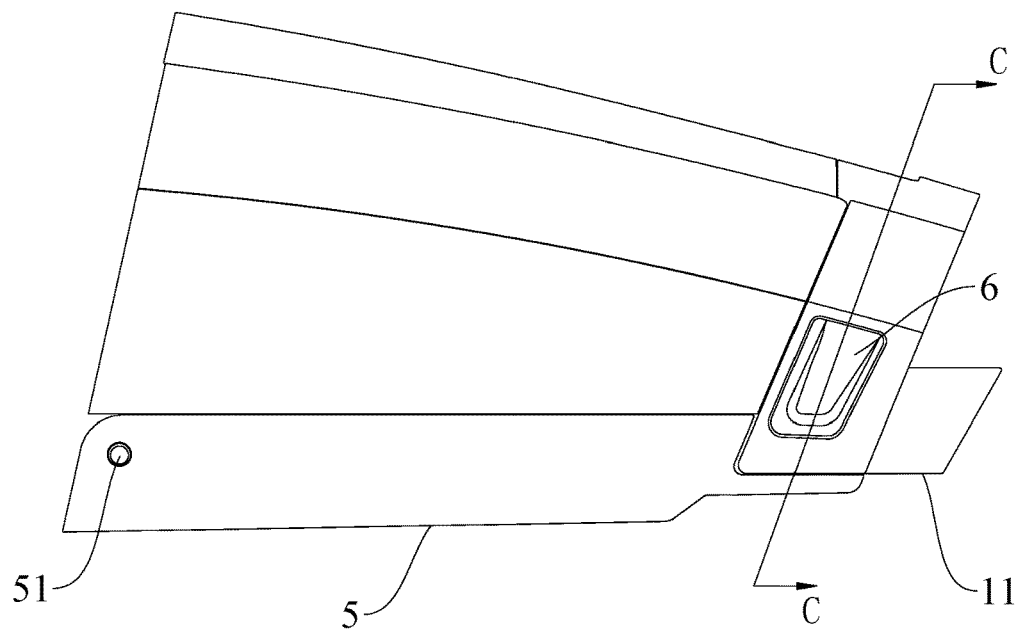
FIG. 9 is a side view of the front portion of the hand-held vacuum cleaner shown in FIG. 8.
Figure 12:
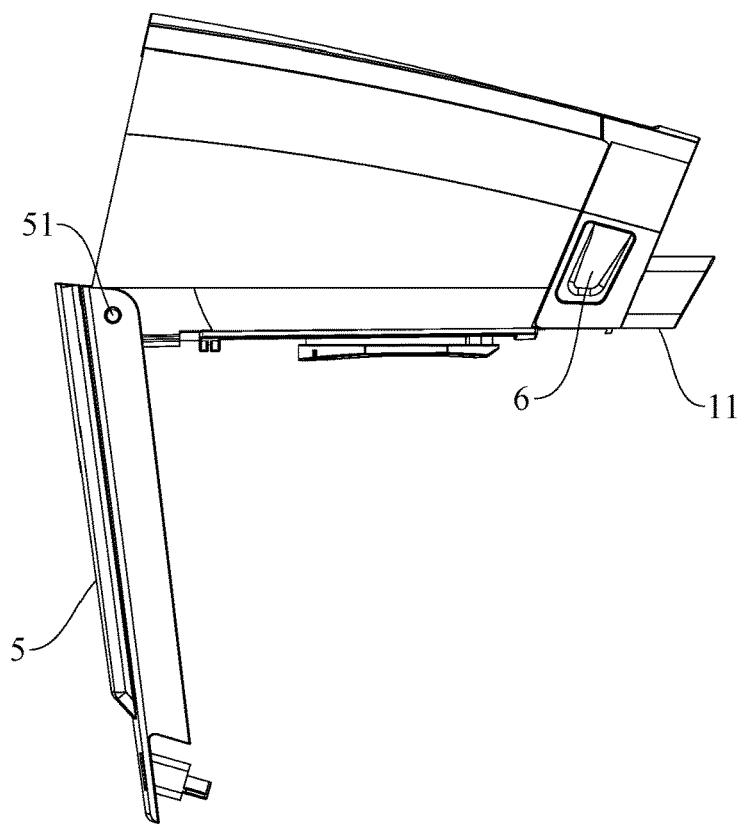
FIG. 12 is another schematic view of the front portion of the hand-held vacuum cleaner shown in FIG. 8, in which an ash pouring plate is in an open position.

As shown in FIGS. 8 to 12, the hand-held vacuum cleaner 100 further includes an ash pouring plate 5, the ash pouring plate 5 is disposed to the bottom of the housing 1, and the ash pouring plate 5 is configured to be movable between an open position where the dust outlet is opened and a closed position where the dust outlet is closed. When the ash pouring plate 5 is in the open position, the dirt, dust and the like in the dust cup 2 are discharged from the dust outlet (as shown in FIGS. 8 and 9); when the ash pouring plate is in the closed position, the ash pouring plate 5 closes the bottom of the dust cup 2, which ensures the normal operation of the dust cup 2 (as shown in FIG. 12).

Thus, by providing the ash pouring plate 5, the dirt, the dust and the like in the dust cup 2 may be conveniently poured out, which greatly simplifies the ash pouring process.

Specifically, referring to FIGS. 8 to 12, an end of the ash pouring plate 5 is pivotally connected to the housing 1, so that the ash pouring plate 5 is rotatable between the open position and the closed position, and the other end of the ash pouring plate 5 is detachably fitted with the housing 1. For example, the ash pouring plate 5 extends in the front-and-rear direction, a rear end of the ash pouring plate 5 may be pivotally connected to the housing 1 through a pivoting shaft 51, and a front end of the ash pouring plate 5 is detachably fitted with the housing 1.

As shown in FIGS. 9 and 10, the forgoing other end of the ash pouring plate 5 is detachably fitted with the housing 1 through at least one fitting mechanism. The fitting mechanism includes a first fitting member disposed to the forgoing other end of the ash pouring plate 5; and a second fitting member disposed to the housing 1. The first fitting member is detached from the second fitting member when the ash pouring plate 5 is in the open position, and the first fitting member is fitted with the second fitting member when the ash pouring plate 5 is in the closed position. Alternatively, the first fitting member and the second fitting member are snaps 7 snapped into each other.

When the forgoing two snaps 7 are snapped into each other, the ash pouring plate 5 is held in the closed position, so that the hand-held vacuum cleaner 100 can operate normally. The airflow to be cleaned entering via the air inlet 111 can be purified and separated by the dust cup 2, and the dirt, dust and the like separated may be collected in the bottom of the dust cup 2. After the completion of the operation of the hand-held vacuum cleaner 100, the two snaps 7 may be disengaged, so that the ash pouring plate 5 is rotated from the closed position to the open position, the dirt, dust and the like collected in the dust cup 2 may directly fall outside the housing 1 through the dust outlet.

Further, as shown in FIGS. 8 to 12, the hand-held vacuum cleaner 100 further includes a press button 6 disposed to the housing 1, the second fitting member is disposed to the press button 6, and the second fitting member moves in a direction away from the first fitting member to be detached from the first fitting member when the press button 6 is pressed. For example, referring to FIG. 10, an extending plate extending horizontally in a direction of the center of the housing 1 is disposed on an inner surface of the press button 6 (i.e. a surface adjacent to the center of the housing 1), and the second fitting member (for example, the snap 7) is disposed to a free end of the extending plate. When the press button 6 is pressed, the second fitting member moves in a direction of the center of the housing 1 and finally is detached from the first fitting member, so that the front end of the ash pouring plate 5 may rotate downward to open the dust outlet under the effect of its own gravity.

As shown in FIG. 10, an elastic element 8 is disposed between the press button 6 and the dust cup 2, and the elastic element 8 is configured to normally push the press button 6 in a direction away from the center of the housing 1. Alternatively, the elastic element 8 is a spring. Thus, when the ash pouring plate 5 is in the closed position, the first fitting member and the second fitting member are fitted with each other all the time under the effect of the elastic force of the elastic element 8 (for example, the spring), and further the ash pouring plate 5 is held in the closed position.

Alternatively, two fitting mechanisms are provided and the two fitting mechanisms are symmetric with each other in the left-and-right direction. Thus, the reliability of the connection of the ash pouring plate 5 is effectively ensured.

Further, a seal element is disposed between the ash pouring plate 5 and the dust outlet to seal a gap between the ash pouring plate 5 and the dust outlet. Thus, by providing the seal element, the sealing of the dust outlet is further ensured.

Figure 13:
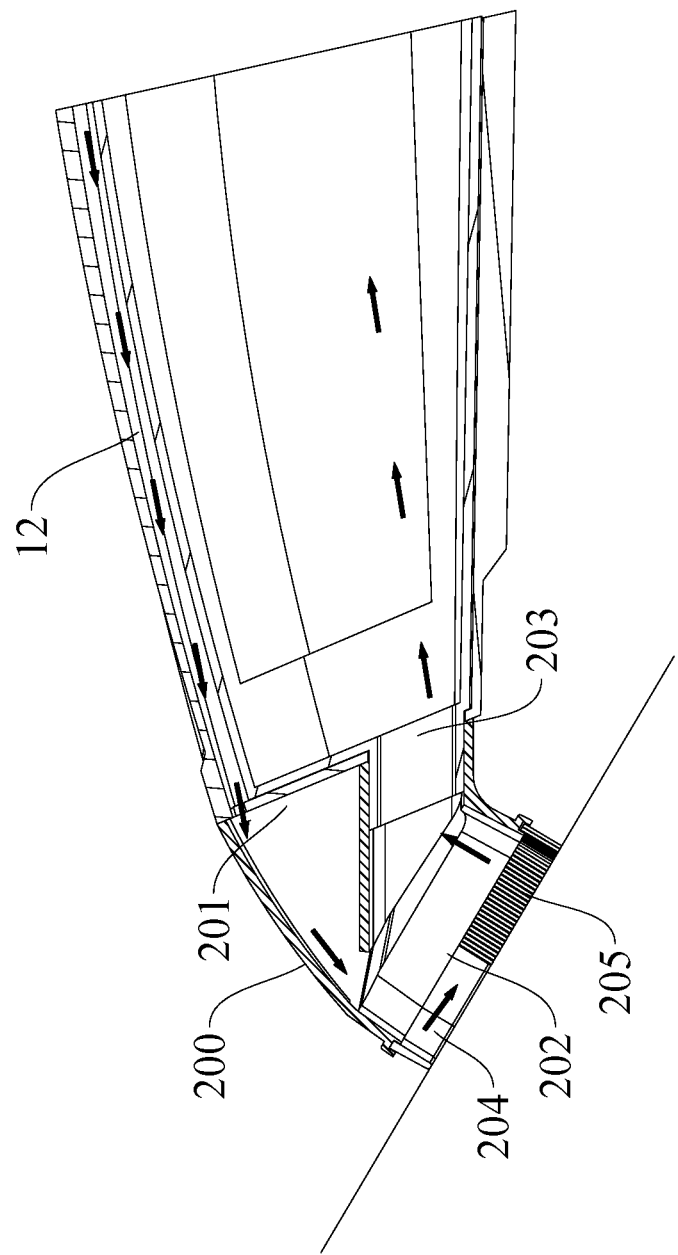
FIG. 13 is an assembly view of a front portion of a hand-held vacuum cleaner and a floor brush according to an embodiment of the present disclosure.

According to an embodiment of the present disclosure, as shown in FIG. 13, the forgoing hand-held vacuum cleaner 100 may be used in cooperation with a floor brush 200 such as a pet brush. In the following description of the present application, the floor brush 200 which is the pet brush is taken as an example for illustration. Certainly, it should be understood by those skilled in the art that, the floor brush 200 may be other types of floor brushes 200, which is not limited to the pet brush.

Specifically, the floor brush 200 such as the pet brush is provided with a floor brush inlet 201, a floor brush outlet 203 and a floor brush opening 202. The floor brush inlet 201 is in communication with the air blowing vent 121 of the hand-held vacuum cleaner 100, the floor brush outlet 203 is in communication with the air inlet 111 of the hand-held vacuum cleaner 100, the floor brush opening 202 is located at a side of the floor brush 200 away from the housing 1. The airflow blowing from the air blowing vent 121 first flows to the floor brush opening 202 through the floor brush inlet 201, and then flows to the air inlet 111 through the floor brush outlet 203. In other words, the airflow blowing from the air blowing vent 121 may first flow to hairs of the pet such as a cat, a dog, etc. sequentially through the floor brush inlet 201, the floor brush opening 202, the hairs and the hairs, dust and the like fallen on the skin are blown away, and then the airflow enters the hand-held vacuum cleaner 100 via the air inlet 111 after passing through the floor brush opening 202 and floor brush outlet 203 sequentially. Alternatively, the floor brush 200 is removably connected to the housing 1.

Thus, by using the floor brush 200 such as the pet brush in cooperation with the hand-held vacuum cleaner 100, the surface to be cleaned such as the hairs and the skin of the pet can be better cleaned, which has a good cleaning effect.

The floor brush 200 defines an air inlet channel, the floor brush inlet 201 is formed in a free end of the air inlet channel, and the air inlet channel has a section area gradually reducing in a flow direction of the airflow. Thus, the airflow may flow to the surface to be cleaned at a certain flow rate, so that the dust and the like on the surface to be cleaned can be better blown away. As shown in FIGS. 1 and 13, the air inlet 111 is formed in a free end of the air inlet pipe 11 (for example, a left end in FIGS. 1 and 13), and the air inlet pipe 11 extends outsides the housing 1. The free end of the air inlet pipe 11 is connected to the floor brush outlet 203 in an insertion manner. Thus, by adopting the insertion manner, the assembling is convenient, and the assembling efficiency is high.

Referring to FIG. 13, a baffle 204 is disposed to a side of the floor brush opening 202 located at the air blowing vent 121. Thus, by providing the baffle 204, the baffle 204 has a certain guide function to the airflow blowing from the air blowing vent 121, so that the dust and the like on the surface to be cleaned can be better blown away by the airflow blowing from the air blowing vent 121.

Further, a bristle 205 is disposed to a portion, excluding the side of the floor brush opening 202 located at the air blowing vent 121, of the floor brush opening 202. Thus, by providing the bristle 205, when cleaning the surface to be cleaned such as hairs and skin of the pet, the hairs of the pet can be groomed.

With the hand-held vacuum cleaner 100 according to embodiments of the present disclosure, the cleaning effect on the surface to be cleaned is better.

Other constitutions and operations of the hand-held vacuum cleaner 100 according to the present disclosure is well known by those skilled in the art, which will not be described in detail herein.

Reference throughout this specification to "an embodiment," "some embodiments," "an illustrative embodiment" "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and illustrated, it shall be understood by those skilled in the art that various changes, modifications, alternatives and variants without departing from the principle and idea of the present disclosure are acceptable. The scope of the present disclosure is defined by the claims and its equivalents.

What is claimed is:

1. A hand-held vacuum cleaner, comprising:
a dust cup comprising a first cyclone, a cyclone assembly, and a filtration member, wherein
the first cyclone has an air intake channel having a first air intake and a first air vent, the cyclone assembly comprises a plurality of second cyclones arranged in parallel along a circumferential direction of the first cyclone, a guiding channel is defined between two of the plurality of the second cyclones, the guiding channel is in communication with the first air vent and an airflow is guided to an outer circumference of the cyclone assembly along a tangent line to a circumferential wall of the second cyclone adjacent to the guiding channel, each second cyclone has an air inducing notch to allow the airflow to enter the second cyclone in a tangent direction, each second cyclone is provided with an air guiding pipe, the air guiding pipe is spaced apart from an inner circumferential wall of the second cyclone, the air guiding pipe has an air guiding inlet and an air guiding outlet, the air guiding inlet is in communication with the air inducing notch,
the filtration member is disposed along the outer circumference of the cyclone assembly, the airflow in the outer circumference of the cyclone assembly tangentially enters the second cyclone through the filtration member and the air inducing notch; and
a housing having a first end provided with an air inlet and an air blowing vent wherein the dust cup is disposed within the housing and connected to the air inlet the air blowing vent is disposed adjacent to the air inlet.

2. The hand-held vacuum cleaner according to claim 1, wherein the air guiding pipe is disposed eccentrically relative to the second cyclone.

3. The hand-held vacuum cleaner according to claim 1, wherein the air guiding pipe extends in a vertical direction.

4. The hand-held vacuum cleaner according to claim 1, wherein the air guiding pipe is provided with a separating plate therein.

5. The hand-held vacuum cleaner according to claim 1, wherein the air guiding pipe is located in an upper portion of the second cyclone.

6. Claim 1, has been amended to more positively define that both the air inlet and the air blowing vent are disposed on the same end of the housing thereby placing the application in better condition for allowance.

7. The hand-held vacuum cleaner according to claim 1, wherein the filtration member is disposed surrounding the cyclone assembly, an avoiding notch is formed in the filtration member, and the avoiding notch and the guiding channel face each other.

8. The hand-held vacuum cleaner according to claim 1, wherein a connecting wall tangent to a side wall of the second cyclone is connected to a side of the air inducing notch of each second cyclone, and an extension part extends from the other side of the air inducing notch, and an air inducing channel in a tangent direction is defined between the extension part and the connecting wall.

9. The hand-held vacuum cleaner according to claim 1, wherein an inner wall of an end of the air intake channel having the first air vent has a L-shaped guiding surface configured to guide the airflow in the air intake channel to the guiding channel.

10. The hand-held vacuum cleaner according to claim 1, wherein the guiding channel is configured to have a width gradually increasing in a flow direction of the airflow.

11. The hand-held vacuum cleaner according to claim 1, wherein an opening is formed in a bottom of each second cyclone.

12. The hand-held vacuum cleaner according to claim 1, wherein the filtration member is a filter mesh, or an inserting sheet having a filtration hole.

13. The hand-held vacuum cleaner according to claim 1, wherein an electrical motor is disposed in the housing, the electrical motor is provided with an electrical motor chamber in communication with the dust cup, the airflow from the air inlet flows through the dust cup and the electrical motor, and flows out from the air blowing vent.

14. The hand-held vacuum cleaner according to claim 13, wherein the air blowing vent extends obliquely in a direction of the air inlet.

15. The hand-held vacuum cleaner according to claim 13, wherein an air blowing channel is defined in the housing, an end of the air blowing channel is in communication with the electrical motor chamber, and the air blowing vent is formed in the other end of the air blowing channel.

16. The hand-held vacuum cleaner according to claim 13, wherein the air blowing vent is switchably connected to the electrical motor chamber.

17. The hand-held vacuum cleaner according to claim 13, wherein a dust outlet is formed in a bottom of the dust cup, and the hand-held vacuum cleaner further comprising:
an ash pouring plate disposed to a bottom of the housing, and the ash pouring plate being configured to be movable between an open position where the dust outlet is opened and a closed position where the dust outlet is closed.

18. The hand-held vacuum cleaner according to claim 13, wherein an outlet filtration member is disposed between the dust cup and the electrical motor.

* * * * *